US009526010B2

(12) United States Patent
Chung

(10) Patent No.: US 9,526,010 B2
(45) Date of Patent: Dec. 20, 2016

(54) SYSTEM FOR CONTROLLING KEY ACCESS USING AN INTERNET-CONNECTED KEY BOX DEVICE

(71) Applicant: Yuan-Chou Chung, Bellevue, WA (US)

(72) Inventor: Yuan-Chou Chung, Bellevue, WA (US)

( * ) Notice: Subject to any disclaimer, the term of this patent is extended or adjusted under 35 U.S.C. 154(b) by 0 days.

(21) Appl. No.: 15/062,026

(22) Filed: Mar. 4, 2016

(65) Prior Publication Data

US 2016/0337856 A1 Nov. 17, 2016

Related U.S. Application Data

(60) Provisional application No. 62/161,448, filed on May 14, 2015.

(51) Int. Cl.
*H04M 3/00* (2006.01)
*H04W 12/08* (2009.01)
*G07C 9/00* (2006.01)

(52) U.S. Cl.
CPC .......... *H04W 12/08* (2013.01); *G07C 9/00134* (2013.01); *G07C 9/00309* (2013.01); *G07C 2009/00396* (2013.01); *G07C 2009/00793* (2013.01)

(58) Field of Classification Search
CPC ... H04W 84/18; H04W 4/14; H04L 29/08108; H04M 1/72533; H04M 1/72519
USPC .................. 455/41.2, 414.1, 420, 550.1, 466
See application file for complete search history.

(56) References Cited

U.S. PATENT DOCUMENTS

| | | | | | |
|---|---|---|---|---|---|
| 5,590,608 | A * | 1/1997 | Yore | .................. | E05B 19/0005 109/50 |
| 5,646,605 | A | 7/1997 | Leonaggeo | | |
| 5,794,465 | A * | 8/1998 | Hill | ...................... | A45C 11/321 248/552 |
| 8,138,886 | B1 * | 3/2012 | Chang | ................. | E05B 19/0005 340/5.22 |
| 8,217,754 | B1 | 7/2012 | Lerner | | |
| 8,503,631 | B2 | 8/2013 | White | | |
| 8,793,784 | B2 | 7/2014 | Metivier | | |
| 2003/0231102 | A1 * | 12/2003 | Fisher | ................ | G07C 9/00103 340/5.73 |
| 2003/0231103 | A1 * | 12/2003 | Fisher | ................ | G07C 9/00103 340/5.73 |
| 2005/0206499 | A1 * | 9/2005 | Fisher | ................. | E05B 19/0005 340/5.73 |
| 2005/0207087 | A1 * | 9/2005 | Fisher | ................. | E05B 19/0005 361/160 |
| 2013/0187756 | A1 | 7/2013 | Fisher | | |
| 2013/0331027 | A1 * | 12/2013 | Rose | ..................... | H04W 12/06 455/41.1 |
| 2014/0118107 | A1 | 5/2014 | Almomani | | |
| 2014/0260452 | A1 | 9/2014 | Chen | | |

(Continued)

*Primary Examiner* — Steve D Agosta
(74) *Attorney, Agent, or Firm* — Bold IP, PLLC; Maki Imakura

(57) ABSTRACT

A system for controlling key access using a phone and Internet-connected key box device. The key box device comprises a SIM card programmed with a unique phone number associated with the key box. Calling the phone number using any phone will provide access to the key box. A cloud computing software application then interfaces with operations programmed into a circuit board. A user then unlocks a key chamber by calling the number at a scheduled time. The key box device owner monitors and controls access to the box and its key chamber via the software application.

18 Claims, 3 Drawing Sheets

(56) References Cited

U.S. PATENT DOCUMENTS

2014/0359292 A1 12/2014 Kawamura

* cited by examiner

SYSTEM FOR CONTROLLING KEY ACCESS USING AN INTERNET-CONNECTED KEY BOX DEVICE

CROSS-REFERENCE TO RELATED APPLICATIONS

This application claims priority to U.S. Provisional Application No. 62/161,448 filed May 14, 2015. The content of the above application is incorporated by reference in its entirety.

FIELD OF THE DISCLOSURE

This disclosure relates generally to the field of electronic lock and key devices.

BACKGROUND

A property owner who is selling a property by herself or renting the property on the market must stay close to the property in order to complete the check-in and check-out process of accessing the property. Typically, access is gained by using a keyed door or gate. If the owner cannot be near the property, several problems occur. The owner may put the key in an insecure or hidden place, such as under the door mat or under a flower pot. The visitor often then needs to communicate with the owner to find the key. In addition, some visitor may forget to return the key when they check out. Furthermore, owners may place the key in an analog key box and its pass-code needs to be memorized and changed periodically. In other cases, the owner may install a digital door lock which permanently changes the door configurations. In addition, many electronic key boxes requires the visitors to install an App on their phone or to hold a pre-delivered device, such as an RFID tag. Not all visitors can meet these requirements.

Many door locks controlled by Internet Applications accidentally open or close when no one is home. Some systems require a Wi-Fi connection for the digital door to function, and the digital door lock may be out of Wi-Fi range. Furthermore, if the owner has a multi-family property, the above problems become even more cumbersome. Real-time human interaction can be unreliable and costly. An analog key box gives both the owner and the visitor several procedures to memorize and execute. Digital door locks require constant changing of the lock's configurations, and many require the visitor to install a mobile Application. It is clear that a solution is needed that allows for remote access to tenants or agents of the owner without having to coordinate with the owner to locate the key while maintaining a high level of security.

SUMMARY

A system for controlling key access using a key box comprising a chamber for holding a key device; a circuit board coupled to a locking mechanism configured to lock or release the chamber; an antenna coupled to the circuit board for receiving and transmitting wireless phone signals to a trigger release of the chamber; and a *SIM card coupled to the circuit board and antenna; the SIM card comprising a unique phone number registered to the key box, and the phone number accessed wirelessly by a user to access the key device in the chamber.

The disclosed invention comprises an Internet-connected key box device that provides the owner the means to remotely manage "check-in" and "check-out" activities of a visitor in a unique way. A pre-approved visitor can access the key within the Internet-connected key box device by calling the device on his phone, with no other technology involved from the visitor's point of view.

BRIEF DESCRIPTION OF THE DRAWINGS

The drawings described herein are for illustrative purposes only of selected embodiments and not all possible implementations and are not intended to limit the scope of the present disclosure.

DEFINITIONS

Figure 1:
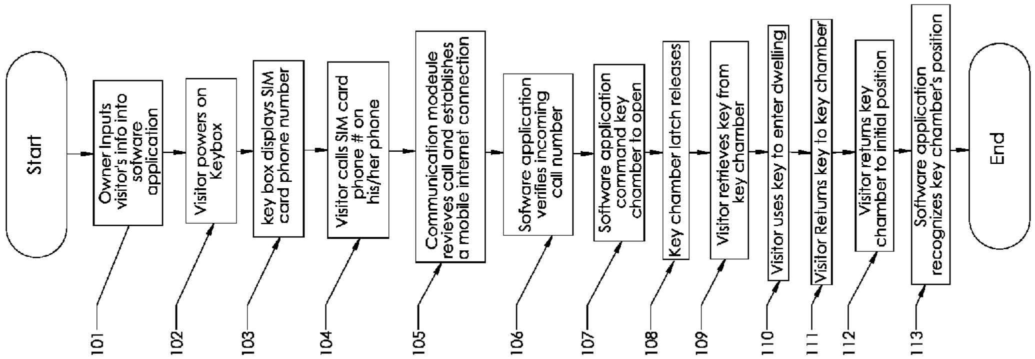
FIG. 1 is a block diagram illustrating the system steps in one embodiment of the present invention.

Circuit: a complete electrical network with a closed loop giving a return path for current.

Cloud computing software application (interchangeable with "software application"): an interactive client-server software application. The application is able to perform messaging, data processing and other functions that a desktop software application performs. A host must log into the software application to access and control its functions. The application's portal is the front-end user interface between the user and the software application. For purposes of the present invention, the portal functions are comprised within the term "software application."

Server: a computer data system that processes and delivers data. The server 306 responds to requests across a computer network to provide network data storage. A server 306 may deliver data to systems on a local area network (LAN) or a wide area network (WLAN) over the Internet.

Communication Module: the telecommunication means that effectuates communication between the key box device and the cellular network. The communication module is a mobile communication platform featuring the digital, circuit-switched network optimized to include data communications over GSM (global system for mobile communications) and/or GPRS (general packet radio services) standards. The GSM standard was developed by the European Telecommunications Standards Institute to describe protocols for second generation (2G) and future digital cellular networks used by mobile phones. In some embodiments, the communication module used is UMTS/HSDPA, which is a 3G through 3.5G standard.

Key: any device that can open a lock, door, gate, or means of access. Examples are a metal key, a magnetic-strip key card, a scannable bar code key, an RFID tag key device, a Key-FOB device, an integrated circuit-chip card, and other similar devices commonly known in the art as "keys."

Firmware: Software installed on a circuit board. When a Printed Circuit board 202 comprises a Software Program part of a Software Application, the Program is referred to as Firmware.

Identifier: for this invention, identifiers are information about a person that relates his identity to a device, such as a pre-registered phone number, name, email address, physical appearance, bar code, RFID code, QR™ code, or other unique tagging and tracking method which device can associate with the individual.

Mobile Communication Device: a phone that can perform the functions needed for the key-access System.

Key Box Device: a key container that performs the functions enumerated in the key-access System.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any element in a claim that does not explicitly state "means for" performing a specified function, or "step for" performing a specific function is not to be interpreted as a "means" or "step" clause as specified in 35. U.S.C. §112 ¶6. Specifically, the use of "step of" in the claims herein is not intended to invoke the provisions of U.S.C. §112 ¶6.

Referring to FIG. 1, the steps of one embodiment of the invention start when the owner 301 inputs 101 the visitor 302's info (identifiers), including at least his name and phone number, into the cloud computing software application. The visitor 302 will then power on 102 the key box device 201 (hereinafter "key box" 201). The key box 201 then displays 103 its SIM card 204 phone number on a digital screen display 206 common in the art. The visitor 302 then calls 104 the box' SIM card 204 phone number on his own phone. The box communication module 203 receives the call and establishes 105 a mobile Internet connection. The cloud computing software application then verifies 106 the incoming call number. The software application then commands 107 the box' key chamber 208 to open via the circuit board 202. The key chamber latch 210 then releases 108, exposing the key. The visitor 302 then retrieves 109 the key from key chamber 208. The visitor 302 then uses the 110 key to enter the dwelling. Upon check-out, the visitor 302 returns 112 the key to the key chamber 208. The visitor 302 then returns 113 the key chamber 208 to its initial position. The software application then recognizes 113 the key chamber's 208 position and powers down the device to the extent possible. This is the END of a single check-in, check-out process.

In an alternative embodiment, the key box 201 acknowledges key-return via an RFID tag-key method rather than the method described above. In an alternative embodiment, the system comprises a load cell which recognizes the weight of the key chamber 208 to differentiate between an empty chamber and a chamber containing a key.

Figure 2B:
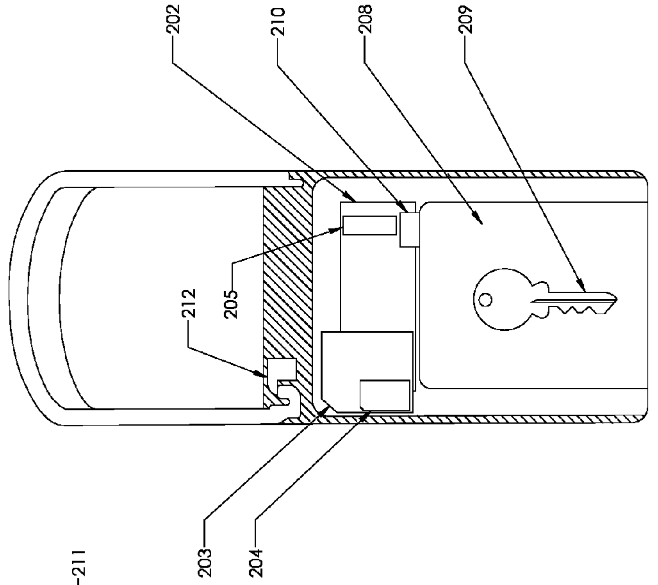
FIG. 2*b* is a front view of the internal components of the key box device in one embodiment of the present invention.
Figure 2A:
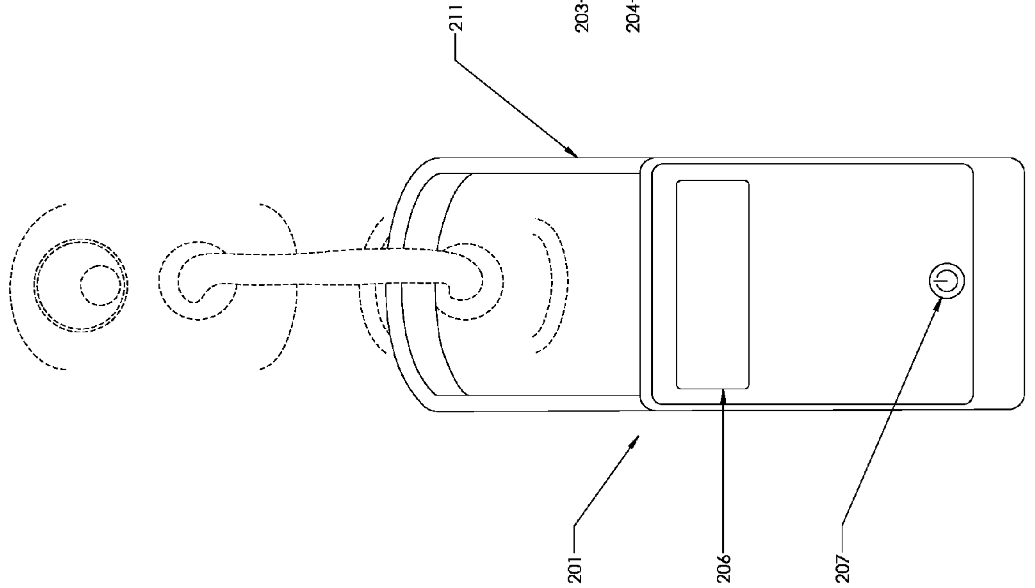
FIG. 2*a* is a front view of the outside of the key box device in one embodiment of the present invention.

The embodiment in FIG. 2*a* illustrates the exterior of the key box 201 device 201. The key box device 201 comprises a detachable hook 211 which fits over a door knob or other dwelling fixture. The visitor 302 presses the power button 207 and the key box 201 will then automatically display its SIM card phone number on its display 206 screen.

The embodiment in FIG. 2*b* diagrams the features on the interior of the key box 201. This embodiment of the key box 201 comprises a circuit board 202, a SIM card 204, a communication module 203, an antenna 205, a key chamber 208, a key chamber latch 210, and a key 209. This embodiment also features a hook latch 212 which can release a detachable hook 212.

Figure 3:
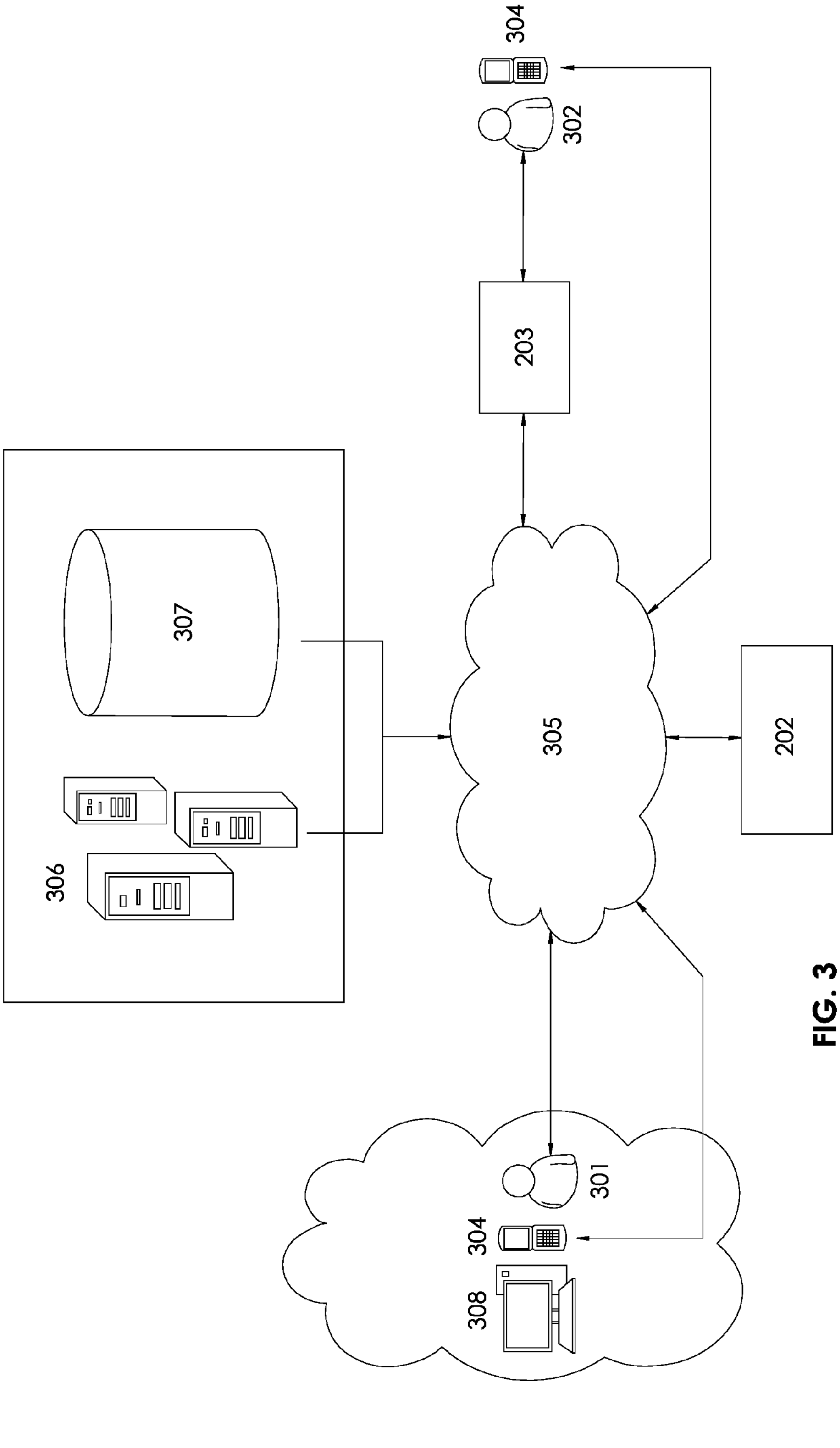
FIG. 3 is a block diagram illustrating the interaction of the communication systems in one embodiment of the present invention.

FIG. 3 is a flow diagram of the system's interactive communication system. The dwelling owner 301 uses his phone 304 or PC 308 to input the name, phone number and check-in/check-out times of a visitor 302 into the software application 305. The software application 305 then stores the visitor 302 data on its database 307 and access it through its server 306. The visitor 302 uses his phone 304 to call the key box 201' communication module 203. The communication module 203 receives the call and accesses the system's software application 305 via the Internet. The circuit board 202 comprises the firmware component of the software application 305 which ultimately executes commands to the key box 201' hook latch 212 and the key chamber latch 210.

The circuit board 202 comprises a microcontroller unit to store and run the needed programs on the software application. Alternatively, a printed circuit board 202 can function as the system's circuit board 202. Embodiments of the device also comprise one or more batteries, a battery chamber, and insulated copper wiring of sufficient length to connect the circuit board 202.

One or more embodiments of the system comprise a servo and a spring mechanism of sufficient tension to eject the key chamber 208 once the key chamber latch 210 is disengaged. This embodiment features a chamber dispenser spring which pushes the key chamber 208 out of the key box 201 as soon as the tip of the key chamber latch 210 is released. Other embodiments comprise an optional load cell and switch. Other embodiments comprise an optional rotation plate.

Further describing the embodiments shown in FIG. 1 through FIG. 3, the SIM card 204 is inserted into the communication module 203, which is connected to the circuit board 202. The antenna 205 is either wire-connected or embedded in the communication module 203, or positioned on the circuit board 202. The circuit board 202 is also connected to a power button 207, to batteries in battery chamber, to an optional servo, to a display 206, to an optional load cell, and to a switch, either by copper wiring or directly embedded in the circuit board 202. The power button 207 can optionally be replaced by motion sensor. A servo may connect to a hinge and swing arm system which can operate the key chamber latch 210 and the hook latch 212. The hook may also release via a hook release button. An alternative embodiment can use two servos to control the latches separately, or other similar mechanism that can effectuate open and closed states.

In one or more embodiments, a rotation plate is on the top portion of the key box 201 and would connect to the hook. Specifically, the circuit board 202 receives a message from the software application and commands the servo to rotate to release the key chamber latch 210 to open the key chamber 208. In the same embodiment, if the circuit board 202 commands the servo rotate in the other direction, it opens the hook latch 212 to release the hook. In another embodiment, a hook release button can also release the hook latch 212. In this embodiment, the owner 301 pushes the hook release button to release the hook from the rotation plate.

Other embodiments feature a hook and body assembly, wherein the hook is disengaged from the body of the key box 201 at one of two anchor points. Once unhooked at one anchor point, gravity and a potential tug from the user or owner 301 will pull the hook away from the body of the key box 201. The hook is reattached at the same anchor points.

In another embodiment of the invention, the key box 201 is attached to a wall or fixture with a mounting assembly. In this embodiment, the hook and hook latch 212 features are no longer necessary, as the mounting assembly is either removable or comprises a mount latch which allows the key box 201 to detach from the wall or fixture.

Electronically, in several embodiments, a program is installed in the circuit board 202 as firmware. This firmware receives input from the communication module 203, the switch, the optional load cell, the power button 207 and the software application via Internet connection. The communication module 203 uses 2G, 2.5G, 3G, 3.5G, 4G, 5G or the current standard in practice at the box's location, at 850, 900, 1800 or 1900 MHz or other optimal frequency performance established by the communication module 203. The firmware then sends output to the display 206, the servo and the software application via Internet connection established by the communication module 203. The software application also takes data from the circuit board 202 and inserts it into the database 307.

In several embodiments, the software application may show data and on the owner 301's personal computer 308 or smart phone 304 device via the software application. The software application may also send data to the database 307, processes commands on the server 306, and communicate with the owner 301 and visitor 302s by sending them notifications. The software application may send notifications via SMS, e-mail, direct phone 304 calling, or other convenient means.

In several embodiments of the system, the owner 301 initially inputs visitor 302 data, including the owner 301's and visitor 302's name, phone 304 number, address, and check-in check-out schedule into the database 307 via the software application. The software application may also process data such as weight of objects inside the key chamber 208 via the optional load cell. The software application may also gather, process and utilize information such as battery status and geographic location of the key box 201.

In at least one embodiment of the invention, the software application gives a "time-stamp" to every action taken by owner 301 and visitor 302. The software application may produce web portal display 206s, or "web pages," that may show the owner 301 or user's calendar, maintain a chronological schedule of dwelling visitor 302s, maintain an address book of various visitor 302s' data, and may maintain and process data about various states and actions of the key box 201.

In alternative embodiments of the present invention, the key box 201 may comprise multiple key chambers 208 or attached key chamber 208 modules. The multiple key chamber 208 modules may efficiently share the same communication module 203 and the same mobile Internet connection. An optional USB connector may connect to other key box 201*es* or other key chambers 208 via a daisy-chain connection and may utilize the same software application.

The invention claimed is:

1. A system for remotely granting dwelling access to a visitor, comprising:

a dwelling having at least one fixture on which a key box device may be placed;

a visitor of the dwelling, wherein the visitor has at least an identifying name and phone number;

an owner of the dwelling;

a key box device positioned at at least one access point of the dwelling;

a removable key chamber positioned inside the key box device;

a key to the dwelling positioned inside the key chamber;

a Subscriber Identity Module ("SIM") card phone number which is unique to the key box device;

a display on the key box device which can show at least one phone number;

a cloud-computing software application that enables wireless communication between an owner's mobile communication device and the key box device and between a visitor's mobile communication device and the key box device;

a circuit board connected to the system's cloud-computing software application;

an antenna capable of transmitting and receiving wireless signals;

a communication module which enables the key box device to wirelessly receive data from the visitor's mobile communication device and establishes a mobile Internet connection through the system's cloud-computing software application;

a power source;

access to the dwelling is granted when at least the following steps are performed:

the visitor's phone number, anticipated check-in time, and anticipated check-out time are initially entered into the cloud-computing software application;

a power button on the key box device is engaged by the visitor at about the anticipated check-in time;

the key box device displays the key box device's SIM card phone number on its display;

the visitor calls the key box device's SIM card phone number on their mobile communication device;

the key box device's communication module receives the visitor's call and establishes a mobile Internet connection;

the system's cloud-computing software application verifies that the incoming call number matches the visitor's phone number;

the cloud-computing software application commands the key box device to open its key chamber;

the key box device releases a key chamber latch to expose the key chamber;

the visitor retrieves the key from the key chamber;

the visitor uses the key to enter the dwelling;

the visitor returns the key to the key box device's key chamber;

the key chamber is returned to its initial position within the key box device; and the software application recognizes the key chamber's initial position.

2. The System of claim 1, wherein the key box device further comprises;

a load cell capable of measuring the weight of the key chamber;

a servo control mechanism which controls the chamber latch;

a spring which forces the key chamber substantially out of the key box device.

3. The System of claim 1, wherein the key box device further comprises;

a detachable hook which can fit over a fixture at the dwelling;

a hook latch which releases the hook from the key box device a hook release button which manually opens the hook latch to release the hook from the key box device.

4. The System of claim 1 wherein the software application communicates unauthorized entry attempts to the owner.

5. The System of claim 1, further comprising a manual override system wherein the owner can manually retrieve the key from its chamber.

6. The System of claim 1 wherein the key box device further comprises multiple key chambers, each chamber connected to the system's cloud-computing software application.

7. The System of claim 1, wherein the cloud-computing software application notifies the owner when the key box device's power source is depleted.

8. The System of claim 1 wherein the key box further comprises a battery chamber.

9. The System of claim 1 wherein the key box further comprises a motion sensor that activates the power button when the visitor is within a pre-determined proximity of the key box device.

10. The System of claim 1 wherein the display on the key box device is a screen which can display instructional and salutary information to the visitor.

11. The System of claim 1 wherein the cloud-computing software application stores, processes and communicates the owner's schedule for multiple visitors to the dwelling.

12. The System of claim 1 wherein the cloud-computing software application stores, processes and communicates the identifying information of multiple visitors.

13. The System of claim 1 wherein the cloud-computing software application tracks, stores, processes and communicates the frequency of visitors at the dwelling.

14. The System of claim 1, wherein the communication module utilizes a digital cellular network protocol conforming with the Global System for Mobile Communications (GSM) standard.

15. The System of claim 1, wherein the communication module utilizes a digital cellular network protocol conforming with the Universal Mobile Telecommunications System (UMTS) 3G standard.

16. The System of claim 1, wherein the communication module utilizes a digital cellular network protocol conforming with the 4G Long Term Evolution (LTE) standard.

17. The System of claim 1, wherein the key comprises an electronic radio frequency identification RFID device.

18. The System of claim 1, wherein the key comprises a scannable bar code.

* * * * *